United States Patent
Zamorano Jones et al.

(10) Patent No.: US 9,988,785 B2
(45) Date of Patent: Jun. 5, 2018

(54) FOUR BRAKES SYSTEM FOR THE DOORS OF EXCAVATOR BUCKETS

(71) Applicant: Minetec S.A., Santiago (CL)

(72) Inventors: Claudio Zamorano Jones, Santiago (CL); Bernardo Vera Torres, Santiago (CL); Rubén Felipe Chocobar Chávez, Santiago (CL)

(73) Assignee: MINETEC S.A., Santiago (CL)

( * ) Notice: Subject to any disclaimer, the term of this patent is extended or adjusted under 35 U.S.C. 154(b) by 0 days. days.

(21) Appl. No.: 15/058,477

(22) Filed: Mar. 2, 2016

(65) Prior Publication Data

US 2017/0009423 A1    Jan. 12, 2017

(51) Int. Cl.
 E02F 3/407    (2006.01)
 F16F 13/00    (2006.01)
 E02F 9/22    (2006.01)

(52) U.S. Cl.
 CPC ............ *E02F 3/4075* (2013.01); *F16F 13/00* (2013.01); *E02F 9/2203* (2013.01)

(58) Field of Classification Search
 CPC .................................................. E02F 3/4075
 USPC ........................................................ 37/445
 See application file for complete search history.

(56) References Cited

U.S. PATENT DOCUMENTS

| 2,160,432 | A  | * | 5/1939 | Davidson | E02F 3/4075 188/83 |
| 5,735,067 | A  |   | 4/1998 | Isley et al. | |
| 5,815,960 | A  |   | 10/1998 | Soczka | |
| 7,096,610 | B1 | * | 8/2006 | Gilmore | E02F 3/4075 37/445 |
| 9,096,993 | B2 | * | 8/2015 | Gross | E02F 3/4075 |
| 9,180,558 | B2 | * | 11/2015 | Bienfang | B23P 11/00 |
| 2012/0192465 | A1 | * | 8/2012 | Opazo | E02F 3/4075 37/444 |
| 2012/0260538 | A1 |   | 10/2012 | Schob et al. | |
| 2013/0192100 | A1 | * | 8/2013 | Gilmore | E02F 9/006 37/445 |
| 2014/0007469 | A1 | * | 1/2014 | Gross | E02F 3/4075 37/445 |
| 2014/0205412 | A1 | * | 7/2014 | Bienfang | E02F 3/425 414/697 |
| 2015/0033594 | A1 | * | 2/2015 | Nicoson | E02F 3/4075 37/445 |

* cited by examiner

*Primary Examiner* — Matthew D. Troutman
(74) *Attorney, Agent, or Firm* — Hoffman Warnick LLC

(57) ABSTRACT

A brake system for the doors of excavator buckets which increases the braking force of the doors, allowing the use of heavier caps with more shield, increasing the durability and reliability, cushioning the blows of the door against the frame of the bucket and decreasing the likelihood that the whole system is deregulated at the same time.

8 Claims, 4 Drawing Sheets

(Previous Art)

(Previous Art)

Previous Art

FOUR BRAKES SYSTEM FOR THE DOORS OF EXCAVATOR BUCKETS

CROSS-REFERENCE TO RELATED APPLICATIONS

This application claims the benefit of co-pending Chilean Patent Application No. CL 1928-2015, filed 7 Jul. 2015, which is hereby incorporated herein as though fully set forth.

TECHNICAL FIELD

The present disclosure is developed in the field of shovel elements for excavator machines; it specifically discloses a brake system for the doors of excavator buckets.

PREVIOUS ART DESCRIPTION

In a bucket of a mining shovel that has a body and a mobile door mounted with respect to the body, a mechanism is used to slow down the door's swinging, this mechanism can be mechanic or hydraulic; the brake is used to buffer the door's oscillation in the excavator bucket in order to avoid the potential damage due to repeated hits during it closing. In the case of mechanical brakes as shown in FIG. 2 that belongs to U.S. Pat. No. 5,815,960, such brake is composed by a first and a second housing and a plurality of retarding discs compressed between housings. To improve the performance of this kind of brake, an elastic element is located between the first and second housing, such elastic element preferentially being a separate elastic member that is located between each housing, respectively, and the discs.

The thickness of each elastic member is selected according to the total thickness of the discs and the number the elastic members if more than one of such members are used, preferentially one elastic member is used that is a lock washer. Hydraulic brakes as the one showed in FIG. 1 that belongs to U.S. Pat. No. 5,735,067 have a housing that is mounted on an excavator bucket and an axis mounted pivotally to the housing and is connected to an excavator door. The axis spins when the door is opened. The housing has a cylindrical cavity surrounding the axis. The cavity is divided in two volumes by a closing partition and an arm in the axis. The force exerted by the arm forces the hydraulic fluid to pass through a hole between the volumes as the axis spin. The arm has seals in its ends that seal it against the walls of the cavities ends. The ends seals are forced outward due to the hydraulic pressure that is made when the door is closing. A unidirectional valve allows to the hydraulic fluid to divert from the hole when the door is opening.

As can be appreciated from FIG. 4, that belongs to the document US2012/0260538, in the state of the technique only two brakes are employed (30 in FIG. 2) for an excavator bucket, the disclosure proposed uses four brakes for an excavator bucket, which increases the door's braking force, so covers with more shielding can be used, resulting in a heavier door. Additionally, the durability and reliability of the door buffering system increases, because if four brakes instead of two are used it results in an increased braking and swinging control of the door and if in addition in these the four brakes two of them have a different trajectory as compared to the other two, a new advantage is obtained that is that when work is performed with slightly different movement ranges those are not deregulated at the same time, keeping the braking force in at least two of the brakes.

INVENTION SUMMARY

The disclosure proposed consists in a brakes system for the doors of excavator buckets that increases the braking force, allowing the use of heavier covers with more shielding, increasing in that way the durability and reliability, by buffering the hits of the door against the bucket's frame and decreasing the possibility of a deregulation of the whole system at a given time; the system is composed by four brakes in contrast to the standard technique currently used that only uses two brakes, in which such brakes can be of mechanical or hydraulic type, or combinations of thereof.

DETAILED DESCRIPTION OF THE INVENTION

Figure 1:
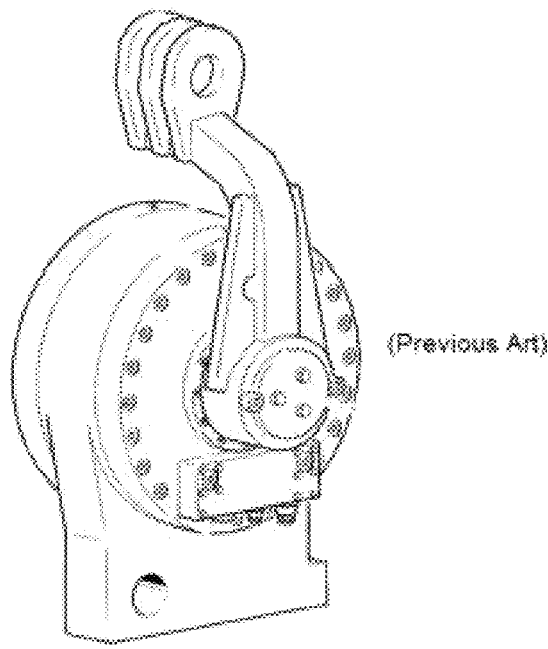
FIG. 1 shows an hydraulic brake.
Figure 2:
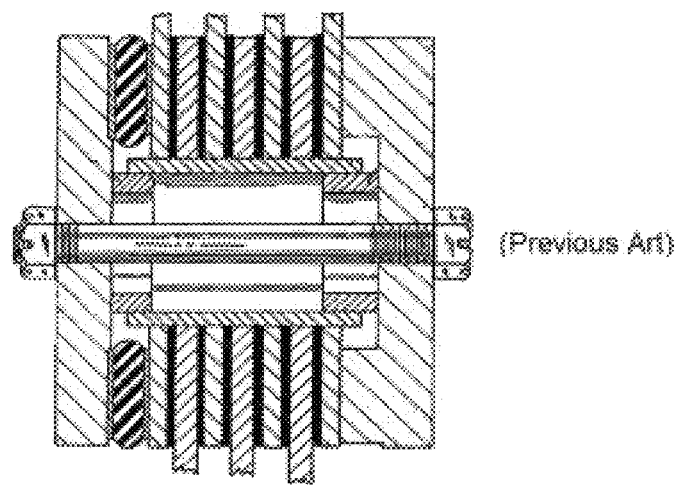
FIG. 2 shows a mechanical brake.
Figure 3:
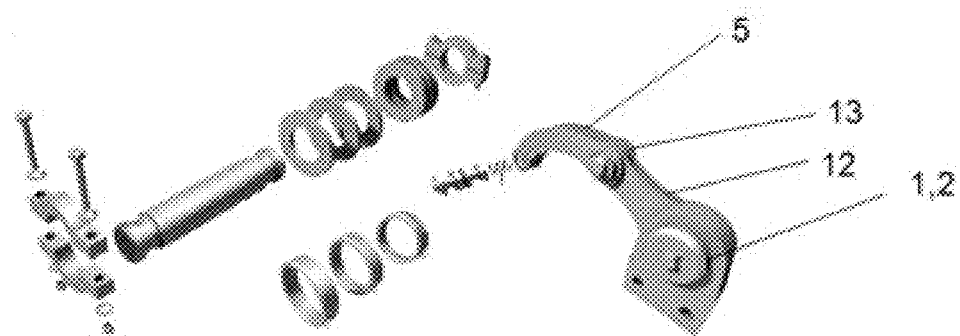
FIG. 3 shows a brake and its activating accessories.
Figure 4:
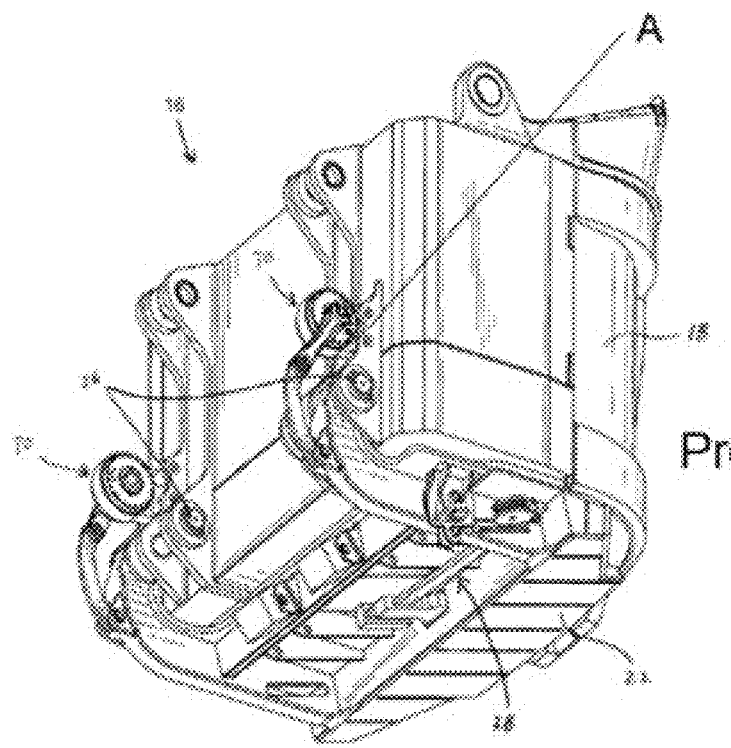
FIG. 4 shows an excavator bucket that uses brakes.
Figure 5:
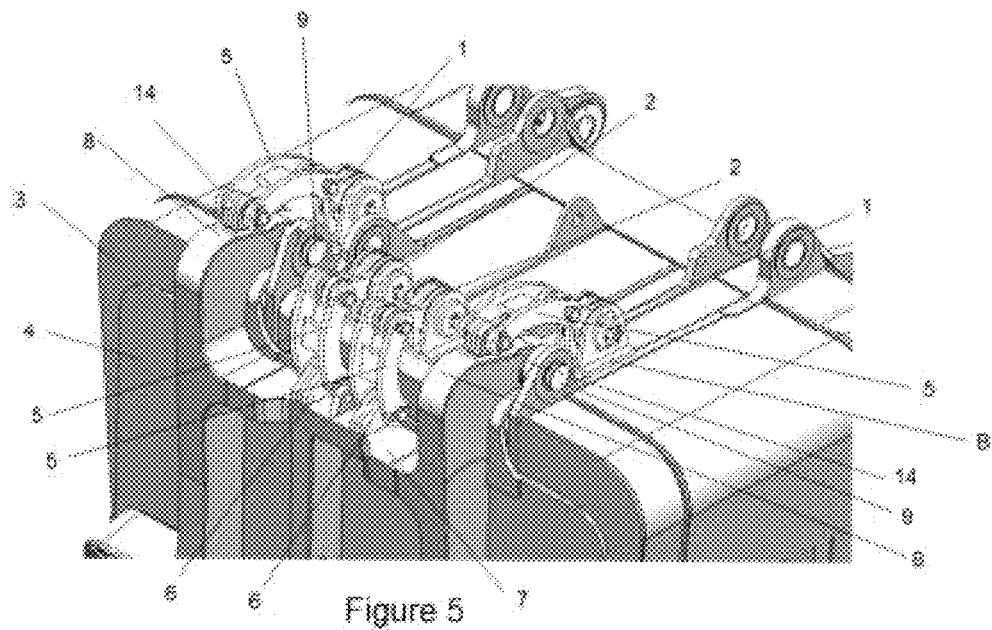
FIG. 5 shows a view of the four brakes already placed.
Figure 6:
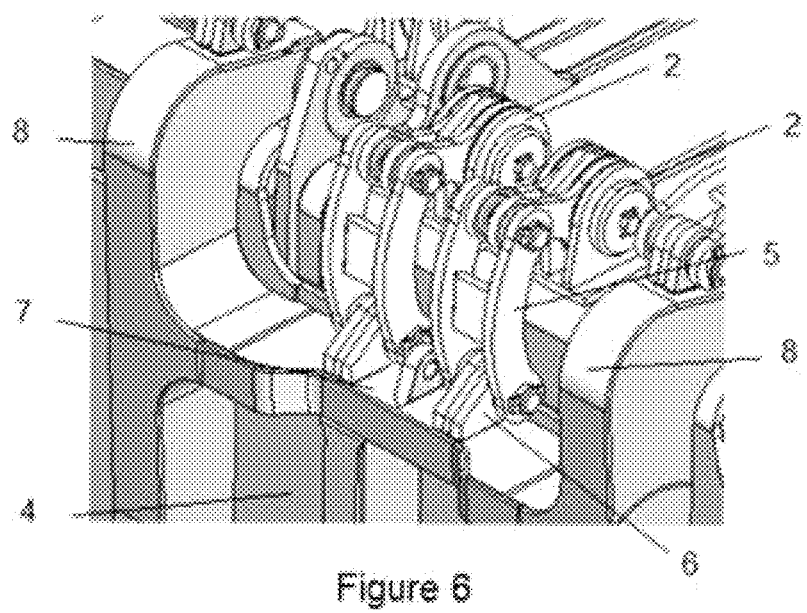
FIG. 6 shows the installation details of the new brakes.

The disclosure proposed can indistinctly be used with brake pairs (1,2) that can be mechanical, hydraulic, or a combination of thereof. As can be appreciated from FIG. 4, a pair of hydraulic brakes are shown (30) traditionally installed in excavator bucket (16). FIG. 5 shows a preferred embodiment of the invention, in which is observed a first pair of brakes (1) aligned between them and a second pair of brakes (2) also aligned between them but in a different line from the first pair of brakes (1) and with different trajectories, these pairs of brakes (1, 2) are used with the aim to buffer the repeated closing of the door (4) that otherwise will strongly hit the frame damaging it.

The disclosure proposed uses four brakes as shown in FIG. 5, the first pair of brakes (1) is located in front of the extension arms of the door (8) and the second pair of brakes (2), aligned between them, is located in a different line to the first pair (1), they are fixed to the bucket's structure in front of the door's upper part (7) between the first pair of brakes (1) that conform the original arrangement, the second pair of brakes (2) are connected by means of a linking arm (5) with perforations in their two ends to the door (4), one of the ends of the merger arm (5) is pivotally fixed to the upper part of the door (7) and the other end is pivotally fixed to the break (2). The connection of the arm to the door's upper part (7) is done by a system of bolt and plates (6) that are located in the same upper part of the door (7), whereas the other end of the linking arm (5) is fixed to the brake arm (12) that also has a perforation (13) for this effect.

The door (4) swings with respect to the bucket (3) by means of extension arms (8) that conform the door's structure and that a perforation on each of it ends and those ends are introduced between two plates (14) welded to the bucket, a bolt (9) pass through the extension arm end (8) and the perforations of the two plates (14) when those are aligned conforming the plates (14), the bolt (9) and the extension arm (8) forms a hinge. Regarding to the types of connection of the brakes to the bucket's structure (3) they are two types either when the brakes are mechanical or hydraulic, the first system consists in a connection with plates and bolts (A) and the second system consists in a welding base (B), in the case of this disclosure, both connection systems can be employed or a combination of thereof.

Figure 7:
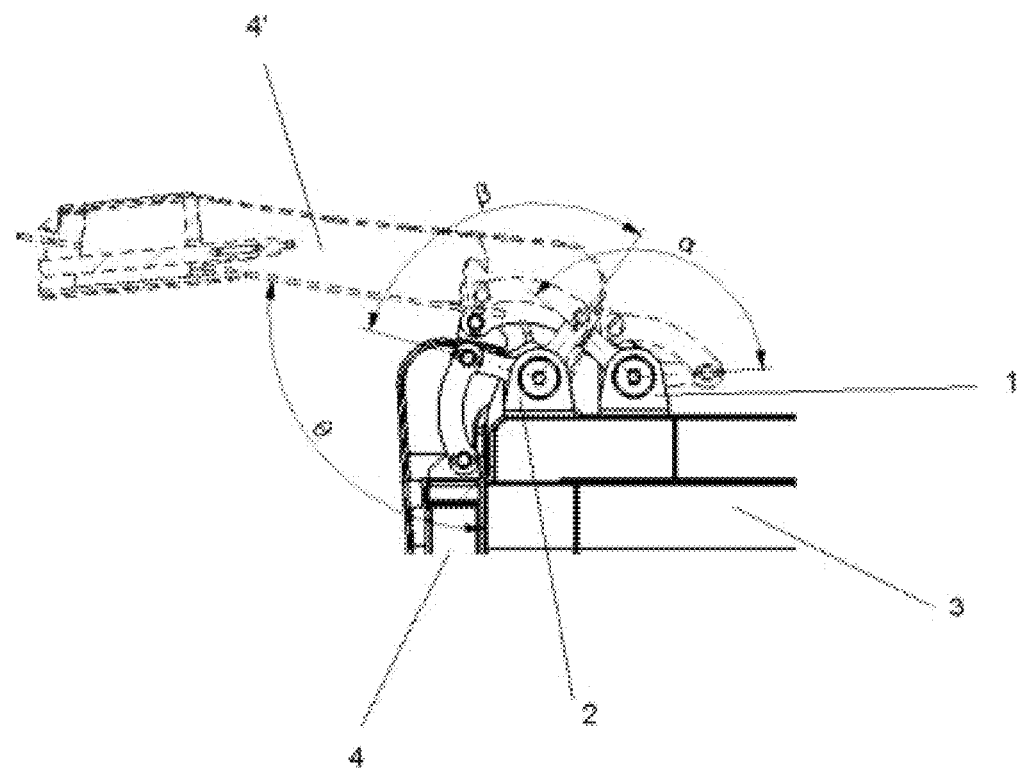
FIG. 7 shows a lateral view of the four brakes for an open and closed position of the door.

In general and with respect to the disposition and characteristics of the braking system different dispositions can be adopted, this is:

The brake system is composed by a first and a second pair of brakes wherein each brake pair is composed for two identical brakes that are either hydraulic or mechanical, aligned between them and that are composed by either:

a first disposition wherein the first and second pair of brakes have the same trajectory between them, or in particular the first and second pair of brakes have a different trajectory between them wherein the first pair of brakes is non-aligned with respect to the second pair of brakes; or a second disposition wherein the first and second pair of brakes have the same trajectory between them, or in particular the first and second pair of brakes have a different trajectory between them wherein the first pair of brakes is aligned with respect to the second pair of brakes As can be observed in FIG. 7 the trajectory angles for each break are shown (1, 2). Because they don't share the same geometrical conditions, they have a different trajectory, that is, for a given angle θ of door opening (4), the trajectory angle β of the second pair of brakes (2) is different to the trajectory angle α of the first pair of brakes (1). Therefore, the brakes are deregulated in a mismatched form in time.

Figure 8A:
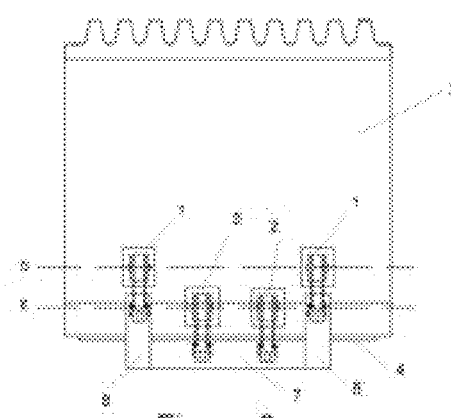
FIG. 8a shows a diagram of the installation of two pairs of non-aligned brakes.
Figure 8B:
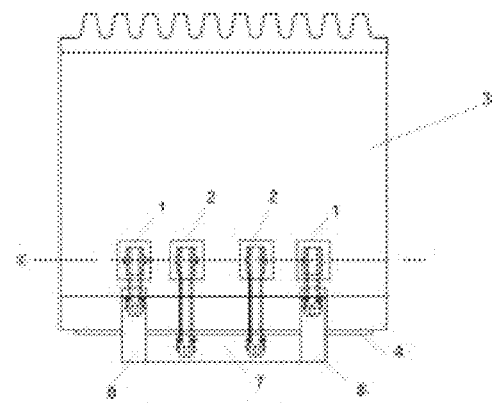
FIG. 8b shows a diagram of the installation of two pairs of aligned brakes.

In FIG. 8a it can be observed two pair of non-aligned brakes, the brakes in this case are aligned in two lines D and E, in FIG. 8b are shown two pairs of brakes aligned according the a sole line C.

The invention claimed is:

1. An excavator bucket comprising:
   a bucket;
   a door hingedly connected to the bucket; and
   a braking system including:
      a first pair of brakes affixed to the bucket, each of the first pair of brakes having a first trajectory angle;
      a second pair of brakes affixed to the bucket and disposed between the first pair of brakes, each of the second pair of brakes having a second trajectory angle different than the first trajectory angle; and
      a plurality of linking arms, each linking arm connected at a first end to one brake of either the first pair of brakes or the second pair of brakes and connected at a second end to the door.

2. The excavator bucket of claim 1, wherein the linking arms connected to each of the brakes of the first pair of brakes is connected at the second end to an extension arm of the door.

3. The excavator bucket of claim 1, wherein the linking arms connected to each of the brakes of the second pair of brakes is connected at the second end to an upper part of the door.

4. The excavator bucket of claim 1, wherein the brakes of the first pair of brakes are disposed along a first line on the bucket.

5. The excavator bucket of claim 4, wherein the brakes of the second pair of brakes are disposed along a second line on the bucket, the second line being offset from the first line.

6. The excavator bucket of claim 5, wherein the second line is disposed nearer the door than is the first line.

7. The excavator bucket of claim 1, wherein at least one of the brakes is a hydraulic brake.

8. The excavator bucket of claim 1, wherein at least one of the brakes is a mechanical brake.

* * * * *